United States Patent
Ambrose et al.

[11] 3,821,050
[45] June 28, 1974

[54] FLEXIBLE HOSE
[75] Inventors: John Ambrose; Edmund J. Shepherd, both of Grimsby, England
[73] Assignee: The Dunlap Company Limited, London, England
[22] Filed: July 18, 1972
[21] Appl. No.: 272,752

Related U.S. Application Data
[62] Division of Ser. No. 105,298, Jan. 11, 1971, Pat. No. 3,717,180.

[30] Foreign Application Priority Data
Jan. 14, 1970  Great Britain............ 1758/70
June 10, 1970  Great Britain............ 28111/70

[52] U.S. Cl............ 156/143, 156/144, 156/149, 156/169, 156/172, 156/187, 156/192, 156/213, 156/215, 156/293
[51] Int. Cl............................ B29d 23/10
[58] Field of Search........ 156/143, 144, 172, 149, 156/169, 187, 192, 213, 215, 293; 138/129, 131, 124, 153, 109

[56] References Cited
UNITED STATES PATENTS
2,688,343  9/1954  Cuddeback................ 156/143
3,119,415  1/1964  Galloway et al............ 138/109
3,548,884  12/1970  Ambrose.................... 138/153
3,737,353  6/1963  Gilbu....................... 156/143

FOREIGN PATENTS OR APPLICATIONS
1,185,508  3/1970  Great Britain............ 138/153
1,082,712  9/1967  Great Britain............ 138/153

Primary Examiner—Charles E. Van Horn
Assistant Examiner—Frank Frisenda, Jr.
Attorney, Agent, or Firm—Stevens, Davis, Miller & Mosher

[57] ABSTRACT

A process for manufacturing flexible hose in which spaced-apart reinforcement rings are fitted to the hose. The rings are of resinous material and contain reinforcement filaments. The resinous material may be applied in an uncured condition and may be applied into channel-section rings which act as moulds for the reinforcement rings, the resinous material being subsequently cured during vulcanisation of the hose assembly, of which the following is a specification.

8 Claims, 3 Drawing Figures

FLEXIBLE HOSE

This is a division of application Ser. No. 105,298, filed Jan. 11, 1971, now U.S. Pat. No. 3,717,180.

This invention relates to flexible hose, and in particular to improvements in reinforcements for such hoses. The hose may be of the non-floating or floating type as is used, for example, for the loadiig of oil to, and from, oil tankers in off-shore loadings and discharge.

Conventional hose of this form particularly when it is of large bore, incorporates a steel reinforcement to provide the necessary strength and crush resistance for the arduous duty in service. The reinforcement is usually applied by helically winding a stout steel wire onto the partially assembled hose but extreme difficulties arise due to the stiffness of the wire and the softness of the uncured hose onto which it is being wound.

Short lengths of hose have been made by sliding solid steel rings onto the hose assembly but again this is difficult and indeed impossible if end fittings of the flanged type are incorporated in the assembly.

According to one aspect of the present invention a process for manufacturing hose comprises forming rings around at least the reinforcing layer for the hose at spaced-apart intervals of uncured resinous material containing reinforcement filaments and subsequently curing the resinous material rings.

Another aspect of the invention provides a process wherein the resinous material is wound into U channel rings positioned around the hose to act as a mould for the resinous material. The resinous material may be mixed with a special catalyst so that curing only occurs at elevated temperature. This ensures curing occurs during the heating to vulcanise the hose assembly.

Yet another aspect of the invention provides a flexible hose comprising an inner lining of elastomeric material, a reinforcement layer or layers of textile or steel wire cord, a plurality of spaced-apart rings of cured resinous material, containing reinforcement filaments, rings of elastomeric filler material between the spaced-apart rings, an outer breaker ply and an outer covering layer.

Still another aspect of the invention provides a buoyant hose. In this arrangement cellular material is placed between the rings and in layers over the rings prior to fitting the outer covering.

The invention also provides a flexible hose line. This is made up of lengths of hose each provided with end fittings which are interconnected to form the pipeline.

Some embodiments of the invention will now be described, by way of example only, in conjunction with the accompanying drawings in which:

FIG. 1 shows the structure of a 24 inch nominal bore hose of the non-floating type. The hose is built on a steel mandrel from which it is removed after final vulcanisation and trimming.

Figure 1:
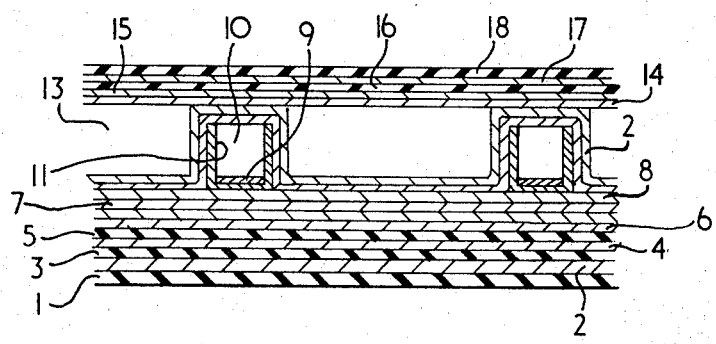
FIG. 1 shows a section of a hose wall of nonfloating construction.

A first layer of uncured rubber is wrapped around the mandrel to form a hose lining layer 1. A first rubberised fabric layer 2 of textile fabric is applied over the hose lining layer followed by a second hose lining layer 3 of uncured rubber and a second rubberised fabric breaker layer 4. These layers together comprise the lining of the hose.

A filler layer 5 of uncured rubber material is laid over the lining and then several layers 6, 7 of textile fabric reinforcement are applied. These layers of fabric are pre-coated with uncured rubber so that the layers bond together to give a homogeneous region of reinforcement.

A third fabric breaker layer 8 is applied to form a base for ring reinforcements 11 which each comprise two half-ring sections of U-shaped cross-section aluminium alloy. Each pair of sections is positioned around the hose to form a continuous annular U-shaped channel and a thin steel strip retaining strap 9 is placed in the base of the channel and coupled at its join to hold the sections in position. Reinforcement rings 11 are placed at 1 inch intervals along the length of the hose to provide both strength and flexibility without the assembly being as heavy as hitherto.

The annular channel of each ring 11 is then filled by winding with pre-impregnated resin/glass fiber rovings 10. This filling 10 is of 60 ends × 152 TEX glass fiber rovings impregnated with a polyester resin compound to which has been added magnesium oxide to produce a dry, handleable pre-impregnated material. A catalyst, tertiary butyl cumyl peroxide is used which causes the resin to cure only at temperatures above about 100° C. The rings act as moulds for the resin/glass fiber material.

A feature of the filling material is that the reinforcement strands are made of a radius of curvature substantially the same as the radius of the channel to be filled and thus, when wound, the fibres form a ring of material of maximum strength and rigidity without any fibres having buckled during winding.

Two fabric breaker plies 12 are applied over the rings 11 and the spaces between the rings are filled with microcellular sponge.

The outer cover comprises a fabric breaker layer 14, a cord or fabric holding ply 15, a sub cover 16 of uncured rubber, another fabric breaker layer 17 and a final covering layer 18.

The assembly is then wrapped tightly with a wet nylon tape to compact the assembly and heated in a steam oven simultaneously to vulcanise the uncured rubber and cure the resin of the resin/fiber glass layers. The nylon tape is removed and the hose is finally trimmed and tested.

The resultant hose contains an integral reinforcement of resin/glass fiber rings. The rings give increased resistance to burst and/or crushing without making the hose as inflexible as normal helical steel reinforcing windings. The material of the rings is non-corrosive and fully compatable with the elastomeric material in the hose structure. The construction is simple and involves no expensive machinery as the annular channels are fitted in parts.

Figure 2:
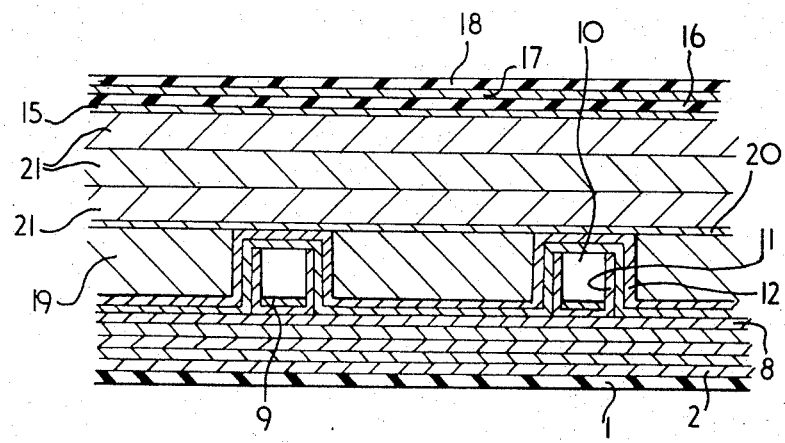
FIG. 2 shows a section of a hose wall of selffloating construction.

The hose shown in FIG. 2 is basically the same as that described above but is in fact a self-floating hose construction. After filling the alloy rings 11 and applying the breaker plies 12 the spaces between the rings are filled with microcellular sponge 19. A fabric breaker layer 20 is then applied and three layers 21 of microcellular sponge are added. The number of layers is determined by the degree of buoyancy required in the finished hose. The outer covering layers 15, 16, 17 and 18 are then applied as in the first embodiment and the hose cured as before.

The finished hose can be used in short lengths in conjunction with rigid sections of metal pipe in which case the hose provides flexible links between the rigid sections. Such pipelines are sometimes used for dredging and additional buoyancy floats are usually attached to the rigid sections. This type of construction is preferable to the normal ball socket joints as the assembly is more flexible, lighter and more easily made self-floating. The increased flexibility allows dredging in larger waves than the ball socket type hoses.

When used for continuous flexible pipelines the hose lengths are provided with end fittings, often of the flanged type, which allow the assembly of long pipelines from many sections of hose.

Figure 3:
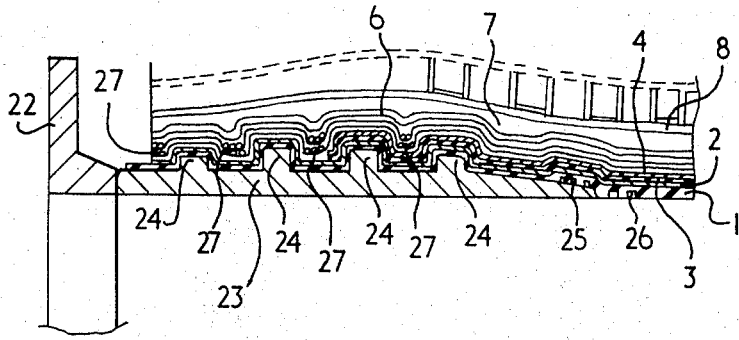
FIG. 3 shows in section the attachment of the end of a hose to an end fitting.

The method of attaching the end fittings is shown in FIG. 3. An end fitting comprises a flange 22 butt welded to a cylindrical nipple 23. The nipple has steel rings 24 welded to its outer diameter to provide a purchase for the hose and a tapered outer diameter 25 at the end to give a smooth overlap for the hose materials.

In manufacture of a hose an end fitting is positioned at either end of the assembly mandrel and a strip of fabric 26 is wrapped over the junction of the nipple and mandrel. The layers of the hose lining 1, 2, 3, 4 are then applied as in the previous construction to overlap and nest between the rings 24 on the nipple 23. The layers of textile fibre reinforcement 6, 7 as in the previous construction also overlap the rings 24 but, after applying each layer, steel wire 27 is wound around the assembly to force the reinforcement and underlying layers into the gaps between the rings. The assembly after the reinforcement layers are applied is the same as in the earlier examples, but this is not illustrated in detail.

Various modifications can be made to the above specific examples. The various breaker plies and reinforcement plies can be of such material as will give the desired results — being of textile, natural or synthetic; or of metal cords, for example, including fine wire metal cords. The textile or metal cords may be applied in single cord length or in the form of multiple parallel cord strip in the form of a woven fabric or in other forms. The resin used to impregnate the glass fibre may be of polyester resin, or alternatively an epoxy resin may be used.

Furthermore, the reinforcement rings may be built up without annular channels or the annular channels may each be in more than two sections. In the assembly of short lengths of hose the channel sections may be formed into continuous rings and positioned on the hose by sliding them on axially. The channel sections may also be of materials other than aluminium. The multiple section annular channels may be temporarily fastened by wire, cord or tapes as long as the temporary fastener does not take up any substantial volume of the channel.

The reinforcement resin/glass fiber material may be in the form of a tape, a cord, or a thick band. In either case sufficient windings are made to fill the annular channel with material.

Having now described our invention, what we claim is:

1. A process for manufacturing flexible hose, comprising:

applying at least one layer of reinforcement material to an inner lining of elastomeric material;

placing a series of channel-section rings over said layer of reinforcement material in spaced relation to each other;

winding a coil of uncured resinous material containing reinforcement filaments into the annular space defined by the walls of each of said channel section rings so that the annular channel acts as a mold for forming spaced-apart rings of said resinous material; and curing said resinous material rings.

2. A process as in claim 1 wherein the curing of the resinous material is carried out by heat applied to vulcanise the hose assembly.

3. A process as in claim 1 wherein the resinous material incorporates a catalyst which only acts at temperatures above the region of 100° C so that curing of the resinous material occurs solely when the temperature of the assembly is raised for vulcanisation of the hose assembly.

4. A process as in claim 3 wherein the resinous material contains magnesium oxide to assist handleability of the material and the catalyst is tertiary butyl cumyl peroxide so that curing occurs only at temperatures above the region of 100° C.

5. A process as in claim 1 wherein the channel-section ring is assembled around the reinforcing material from sections and the assembly is maintained by temporary fastening means until the resinous material is forced into the channel section rings.

6. A process as in claim 1 wherein the resinous material is pre-treated by shaping means to curve the reinforcement filaments and set them at a curvature substantially equal to the curvature of the reinforcement rings in the hose so that the filaments are not buckled when in circumferential positions in the reinforcement rings.

7. A process for manufacturing reinforced flexible hose comprising:

positioning two end fittings each with nipple portions having spaced ring portions on their outer periphery on a mandrel, one at either end, applying a first inner layer of elastomeric material to the mandrel, applying at least one further inner layer of elastomeric material overlapping the said nipple portions, spaced from the first layer by a fabric breaker layer, applying a layer of textile or wire cord reinforcement fabric, a layer of filler of uncured elastomeric material, binding the layers onto the nipple portion of the end fittings by means of a winding of wire over the layers and between the nipple ring portions, fitting channel-section rings over the assembled layers in spaced-apart relationship along the length of the hose, forming resinous material including reinforcement fibres into the channel space around the rings, applying one or more breaker layers of fabric material over the rings, filling the gaps between the rings with elastomeric filler, applying elastomeric material and fabric outer covering layers to the assembly and heating to vulcanise the elastomeric material and cure the resinous material.

8. A process as in claim 7 wherein the space between the rings is filled by buoyant material and further layers of the buoyant material are applied before the outer covering layers.

* * * * *